June 15, 1965  F. SINCLAIR  3,189,004
ANIMAL TETHER
Filed July 2, 1962
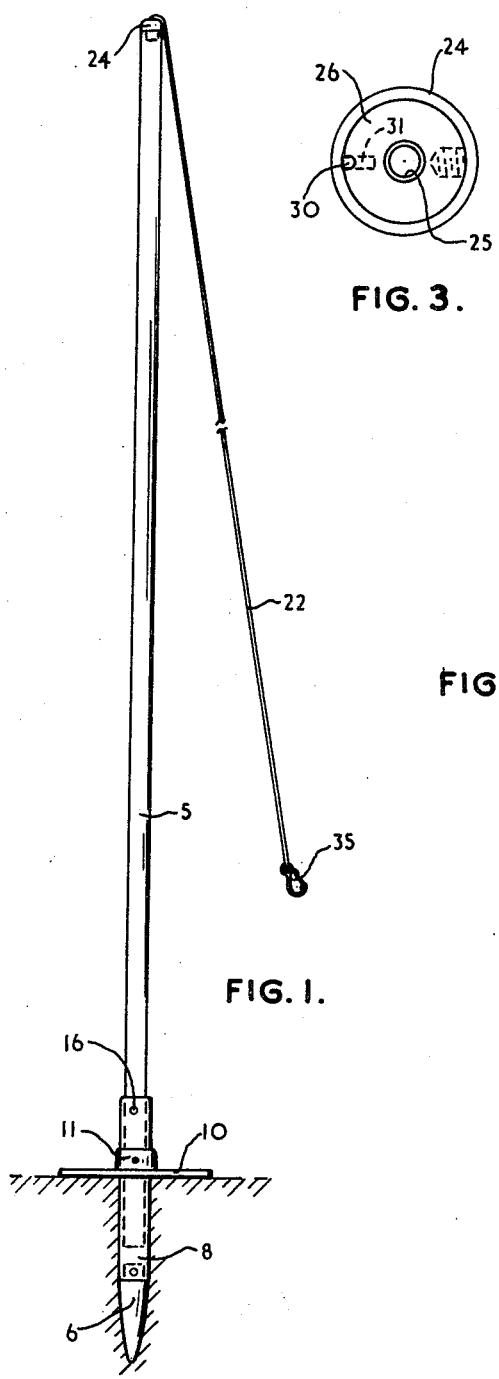
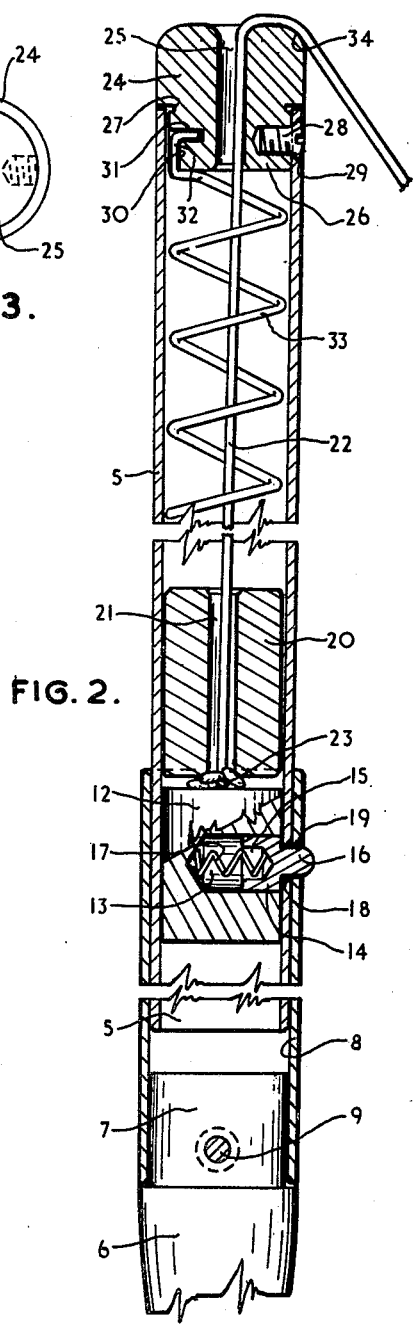
INVENTOR
FRED SINCLAIR
ATTORNEY

# United States Patent Office 3,189,004
Patented June 15, 1965

3,189,004
ANIMAL TETHER
Fred Sinclair, 72 Leonard Ave., Ottawa, Ontario, Canada
Filed July 2, 1962, Ser. No. 206,851
2 Claims. (Cl. 119—124)

This invention relates to improvements in an animal tether and appertains particularly to one adapted for pets, other animals, or the like.

An object of the invention is to provide a safe tender that will allow a live creature to be secured against straying on the end of a retractible line that is precluded from any possibility of snagging or snarling.

A further object of the invention is to provide a non-snarl tether readily attachable to and removable from a stable and secure ground-engaging mount.

A further object of the inventon is to provide a safe, non-snarl animal tether in which the anchored end of the tether line has a counterbalance weight that is allowed limited and cushioned travel movement in the removable column of the device.

A still further object of the invention is the provision of a safe, non-snarl, animal tether comprising but a few simple, low cost, lightweight and easy to assemble parts, thereby allowing the same to be manufactured, distributed and sold at reasonable cost.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

FIGURE 1 is an elevation of a preferred embodiment of the invention;

FIGURE 2 is an enlarged vertical section of the device showing some parts in side elevation and some parts broken away; and FIGURE 3 is a bottom plan view of the special non-snarl cap.

The largest component of my tether device is a tubular column 5 of aluminum or other suitable material here shown as running about 60 inches in length and from 1 to 2 inches in diameter. For conveniently mounting this column in vertical position a ground-engaging mount may be employed such as the pointed wooden peg 6 with a concentric neck 7 of reduced diameter about which a ferrule-like sleeve 8 fits that is firmly secured by a transverse rivet pin 9. The sleeve 8 rises from the peg and may carry a plate 10 with a central upwardly extending collar 11 that closely engages and is fastened to the sleeve 8 substantially below the upper end thereof.

This peg-tipped, ground-engaging mount is driven into the ground until the plate 10 contacts the surface and is normally left in place to provide a stable and secure socket for the removable tether column 5, which latter is of an exterior diameter to slide snugly into the ground mount socket sleeve 8.

To releasably secure the column 5 in the sleeve 8, a circular plug 12 is employed having a radial bore 13 that houses a sliding plunger 14 with a pocket 15 on its that houses a sliding tipped nose 16 of reduced diameter on its outer end that serves as a bolt. A coil spring 17 partially contained in the pocket 15 is compressed between the inner end of the bore 13 and the rear of the plunger 14 urging the nose of the bolt outwardly.

With the plunger 14 pressed in against the action of the spring 17, the plunger-carrying plug 12 is inserted in the open bottom end of the column 5 and moved upwardly until the plunger nose 16 registers with and shoots out through a bore 18 in the column wall, said bore being of a diameter to easily pass the nose of the plunger but stop the enlarged, shouldered outer end of the body of the plunger. This spring-urged projection of the bolt nose through the bore in the column secures the plunger-housing plug 12 in the column 5. A similar bore 19 is provided in the wall of the socket sleeve 8 near its upper end so on insertion of the lower end of the column 5 into the socket sleeve 8, the plunger nose 16 is compressed until in registry with this sleeve bore 19 whereupon it projects or shoots out into it securely locking the column in the socket sleeve of the firm and stable ground-engaging mount. To release the tether column, it is only necessary to depress the button or round tipped nose of the plunger with the thumb so that the same is substantially displaced from the sleeve bore 19 and the column may be withdrawn. It will be noted that this releasably locked connection between the ground-engaging socket mount and the removable column presents no projection that could snarl or snag a tether line.

Disposed within the tubular column 5 in freely sliding relation is a circular counterbalance weight 20 with an axial bore 1. The inner or anchored end of the tether line 22 is threaded downwardly through the bore and its end fused and knotted as at 23 to prevent its withdrawal through the bore.

A unique non-snarl cap 24 closes the upper end of the column 5 having an axial bore 25 to pass the tether line 22. The cap is of the same exterior diameter as the column 5 with a depending stem portion 26 of reduced diameter to fit within the tubular column, there being an undercut 27 at the junction of the stem and body of the cap. A screw 28 is threaded into the stem of the cap, passing through a bore 29 in the column 5 and being countersunk therein so that no projection of the screw head occurs. A vertical groove 30 extending up the stem 26 from the bottom communicates with an axial bore 31 which together accommodate and retain the upbent, inturned end 32 of a coil spring 33. The convolutions of the depending coil spring fit easily within the column 5 and encircle the tether line 22, the spring being designed to be engaged by the weight 20 and arrest its upward movement with a cushioning action. The seating of the inbent upper end 32 of the spring in the bore 31 of the cap prevents vertical displacement of the spring and the containing of the convolutions of the spring within the tubular column preclude its lateral or radial displacement.

In the upper end of the cap 24, the mouth of the bore 25 flares out in a curve of substantial diameter and exterior rim 34 over which the tether line 22 feeds is curved in an arc of greater diameter. Thus formed, the cap 24 assures free and easy passage of the tether line in both directions with absolutely no possibility of the line catching or snarling on any part. Furthermore, the flared mouth of the bore and the wide curve of the outer rim of the cap prevent the line from being normally wound around the column whilst under any tension as any attempted convolutions slide up over the cap rim and resolve into a straight taut portion of the line.

A suitable connecting member such as a snap fastener 35 or the like is secured on the free outer end of the line 22 which may be fused before tieing. In use, the tether line 22 which is preferably less than twice the length of the column 5 can be drawn out against the pull of weight 20 until the latter engages and compresses the cushion spring 33 and on release is retracted by the weight until it comes to rest over the plunger housing plug 12. The ready removal of the plunger housing plug enables access to the weight should the replacement of the line become necessary.

If desired, a second column receiving socket or alternative type of keeper for the column may be provided for use when the tether column is taken indoors.

From the foregoing description taken in connection with the accompanying drawings, it will be manifest that an animal tether is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A tether for pets, other animals, or the like, comprising a ground engaging mounting socket sleeve, a pointed wooden peg with a concentric neck of reduced diameter projecting from one end of said sleeve, a tubular column rising from the other end of said sleeve and releasably locked therein, said column having a removable plug in the socket sleeve engaging end and an apertured cap closing the other end, a retractible tether line passing freely through said cap and a counterbalance weight on an end of said line housed in said column and normally slidable between said removable plug and said cap, wherein said plug houses a spring-urged radially disposed plunger and said tubular column and socket sleeve have normally registering perforations into which said plunger extends serving to normally lock said plug in said column and releasably lock said column in said socket sleeve.

2. A tether according to claim 1, wherein the apertured cap has an external diameter corresponding with the column and a stem of reduced diameter that fits within the end of the column and is secured in place by a screw whose head is counter sunk in the column, the mouth of the cap aperture flaring in a curve of substantial diameter and the exterior rim of the cap over which the tether line feeds is curved in an arc of greater diameter, said cap having a vertical peripheral groove communicating with a radial bore and a coil spring disposed in the end of the column encircling the line with an inbent end seating in the groove and radial bore in said cap.

References Cited by the Examiner
UNITED STATES PATENTS

| | | | |
|---|---|---|---|
| 167,263 | 8/75 | Maguire | 119—124 |
| 556,798 | 3/96 | Ashton | 119—124 X |
| 757,882 | 4/04 | Butterworth | 119—124 |
| 948,626 | 2/10 | Gordon | 119—124 |
| 2,084,239 | 6/37 | Bradford | 119—122 X |
| 2,481,559 | 9/49 | Ashbaugh | 119—124 X |

FOREIGN PATENTS

| | | |
|---|---|---|
| 321,966 | 6/20 | Germany. |

T. GRAHAM CRAVER, *Primary Examiner.*

CARL W. ROBINSON, ARNOLD RUEGG,
*Examiners.*